United States Patent [19]

Seki et al.

[11] Patent Number: 4,870,560
[45] Date of Patent: Sep. 26, 1989

[54] METHOD OF CREATING NC PART PROGRAM FOR LASER MACHINING

[75] Inventors: Masaki Seki; Takashi Takegahara, both of Tokyo, Japan

[73] Assignee: Fanuc Ltd., Minamitsuru, Japan

[21] Appl. No.: 196,220

[22] PCT Filed: Aug. 26, 1987

[86] PCT No.: PCT/JP87/00626
§ 371 Date: Apr. 25, 1988
§ 102(e) Date: Apr. 25, 1988

[87] PCT Pub. No.: WO88/01765
PCT Pub. Date: Mar. 10, 1988

[30] Foreign Application Priority Data

Aug. 29, 1986 [JP] Japan .................................. 61-202983
Aug. 29, 1986 [JP] Japan .................................. 61-202984

[51] Int. Cl.$^4$ ............................................. G05B 19/00
[52] U.S. Cl. ................................. 364/191; 364/474.08; 219/121.78
[58] Field of Search ........... 364/191, 192, 193, 474.23, 364/474.24, 474.2, 474.32, 474.08; 219/121.78

[56] References Cited

U.S. PATENT DOCUMENTS 4,469,930  9/1984  Takahashi ........................... 364/193
4,782,438  11/1988  Mizukado ........................... 364/191

Primary Examiner—Allen MacDonald
Attorney, Agent, or Firm—Staas & Halsey

[57] ABSTRACT

Based on an offset direction which indicates whether a laser beam (RB) is offset in a direction to the right side or left side of a travelling direction contained in a motion definition statement, and the direction of a curve at a corner portion (CN) of a laser beam path ($b_i, b_{i+1}$), it is determined whether an inner side or outer side of the beam path at the corner is a part (PT). If the inner side of the corner is a part, an NC part program for laser machining is created upon inserting a preset escape path (EP) in the corner portion of the beam path. If the outer side of the corner is a part, an NC part program for laser machining is created in such a manner that similarly set machining conditions prevail in preset machining condition modification intervals.

8 Claims, 9 Drawing Sheets

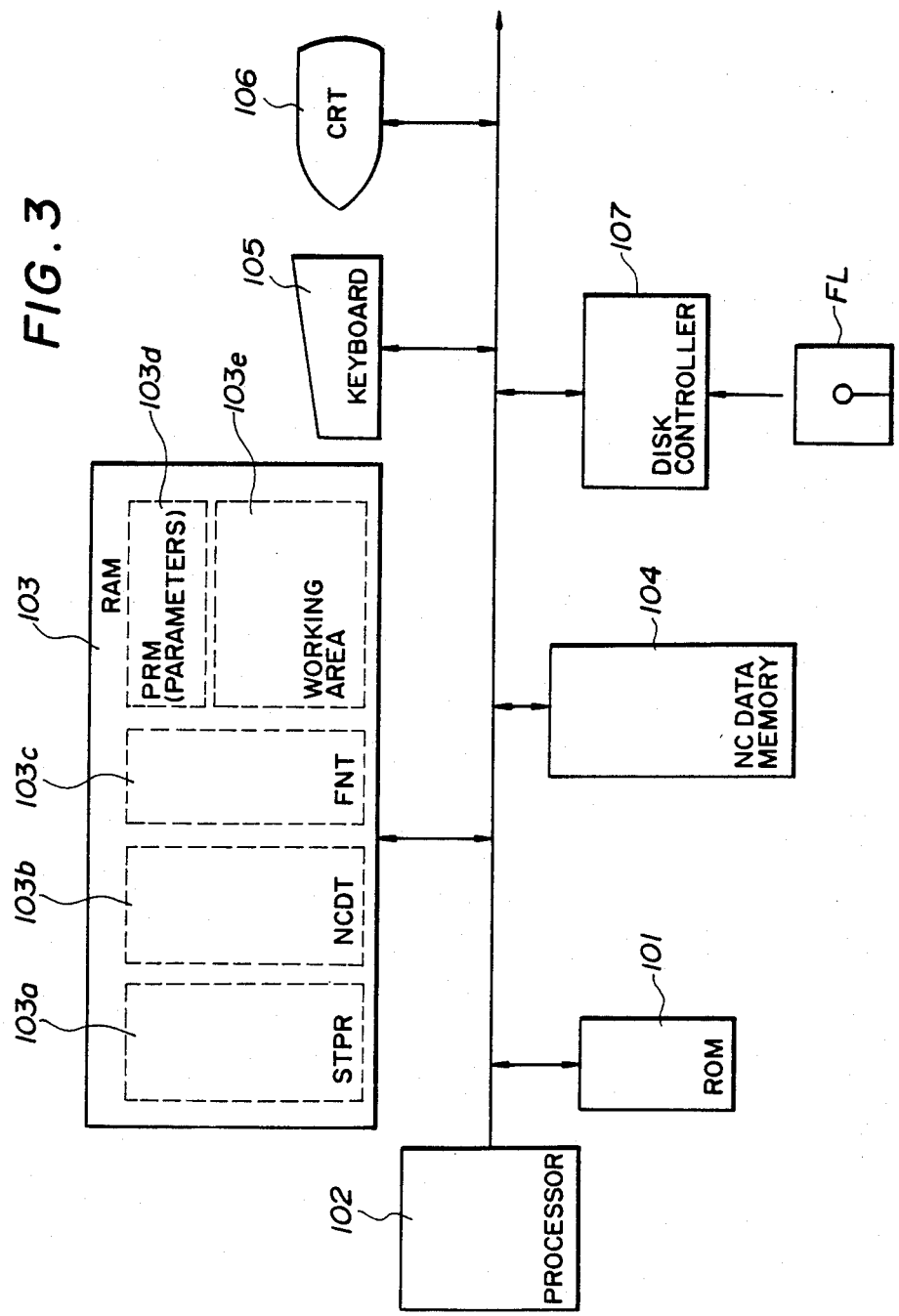

FIG. 4

| COMMAND | F1 | F2 | F3 | F4 | F5 | F6 | F7 | F8 | F9 |
|---|---|---|---|---|---|---|---|---|---|
| SETTING OF COORDINATE SYSTEM | 8502 | 0001 | 0101 | 0201 | 0004 | | | | |
| POSITIONING/ LINEAR CUTTING | 8202 | 8002 | 0001 | 0101 | 0201 | 0141 | 0004 | | |
| CIRCULAR ARC CUTTING | 8202 | 8012 | 0001 | 0101 | 0301 | 0401 | 0004 | | |
| TOOL SELECTION | --- | --- | --- | --- | --- | --- | --- | --- | |
| SPINDLE SPEED | --- | --- | --- | --- | --- | --- | --- | --- | |

NCDT

FIG. 5

FNT

| FUNCTION CODE | NC DATA OUTPUT FORMAT |
|---|---|
| 0000 | NO FUNCTION |
| XX00 | FEED OUTPUT XX·NUMBER OF FEED OUTPUTS |
| 0001 | X-AXIS POSITION DATA OUTPUT X00···0 |
| 0101 | Y-AXIS POSITION DATA OUTPUT Y00···0 |
| 0201 | Z-AXIS POSITION DATA OUTPUT Z00···0 |
| 0301 | X-AXIS POSITION DATA OUTPUT FOR CENTER OF CIRCULAR ARC I00···0 |
| 0401 | Y-AXIS POSITION DATA OUTPUT FOR CENTER OF CIRCULAR ARC J00···0 |
| 0141 | F-CODE OUTPUT F000 |
| --- | --- |
| 8002 | POSITIONING OR LINEAR CUTTING G-CODE OUTPUT G00 OR G01 |
| 8012 | CLOCKWISE OR COUNTER-CLOCKWISE CIRCULAR ARC CUTTING G-CODE OUTPUT G02 OR G03 |
| 8202 | ABSOLUTE OR INCREMENTAL COMMAND G-CODE OUTPUT G90 OR G91 |
| 8502 | COORDINATE SYSTEM SETTING G-CODE OUTPUT G50 |
| --- | --- |
| 0004<br>0104 | EOB (END-OF-BLOCK OUTPUT)  EOB<br>EOR (REWIND STOP CODE) OUTPUT  % |

METHOD OF CREATING NC PART PROGRAM FOR LASER MACHINING

DESCRIPTION

1. Technical Field

This invention relates to a method of creating, an NC part program for laser machining and, more particularly, to an NC part program creation method capable of improving machining precision at corners.

2. Background Art

In automatic programming for creating NC data using an automatic programming language such as APT or FAPT, (a) a part program based on the automatic programming language is created by defining points, straight lines and circular arcs using simple symbols (this is referred to as "figure definition"), and then defining a tool path using the defined points, straight lines and circular arcs (referred to as "motion statement definition"), and (b) the part program based on the automatic programming language is subsequently converted, by using an NC data output table, into NC data comprising NC data (EIA codes or ISO codes) in a format capable of being executed by an NC unit. It should be noted that the tools used include, in addition to ordinary tools, the wire in a wire-cut electrical discharge machine, the laser beam in a laser processing machine, etc.

For example, in the creation of a part program for moving a tool (laser beam) along a profile comprising straight lines and circular arcs shown in FIG. 10, figure definition is performed by defining a tool starting point $P_1$, cutting starting point $P_2$, straight lines $S_1$, $S_2$ and circular arc $C_1$ . . . as follows:

| | |
|---|---|
| PART, @REIDAI | (1) |
| MCHN, MILL, ABS | (2) |
| $P_1 = x_1, y_1$ | |
| $P_2 = x_2, y_2$ | |
| $P_3 = x_3, y_3$ | |
| $S_1 = P_2, P_3$ | (3) |
| $C_1 = x_4, y_4, r1$ | (4) |
| $P_5 = x_5, y_5$ | |
| $S_2 = P_5, C_1, B$ | (5) |

Thereafter, by using these defined points, straight lines and circular arc, a motion statement is defined in automatic programming language, the motion statement being in line with the following and the tool path:

| | |
|---|---|
| CUTTER, 0.3 | (6) |
| S0800 | (7) |
| TLLFT | (8) |
| FROM, $P_1$ | (9) |
| RPD, TO, $S_1$, $P_2$ | (10) |
| FCOD, 500 | (11) |
| $S_1$ | |
| $C_1$ | |
| $S_2$ | |
| FINI | |
| PEND | |

When this is inputted to an automatic programming unit, the latter subsequently creates and outputs NC data having an EIA code or ISO code execution format automatically while referring to an NC data output table.

In the foregoing, (1) instructs the start of the part program, with "REIDAI" being the header.

(2) indicates the type of NC machine. "MILL" is used in case of milling, "TURN" in case of turning, "CUT" in case of a wire-cut electrical discharge machine, and "LASER" in case of laser machining. "ABS" indicates an absolute command. ("INCR" would be used for an incremental command.)

(3) signifies a straight line passing through points $P_2$, $P_3$.

(4) signifies a circular arc of center $(x_4, y_4)$ and radius r1.

(5) signifies a lower tangent line (straight line) of two tangent lines passing through point $P_5$ and contacting the circular arc $c_1$. In the case of the upper tangent line, the alphabetic character A would be used instead of B.

(6) represents a beam command which commands a beam diameter of 0.3 mm.

(7) represents a command indicating that the laser power is 800 W.

(8) is a command for offsetting the tool to the left of the direction of movement. ("TLRGT" would be used to offset the tool to the right of the direction of movement.)

(9) is a coordinate system setting command which indicates that the starting point is $P_1$.

(10) is a command for positioning the cutter in such a manner that the cutter will contact the straight line $S_1$ at point $P_2$ without passing this straight line.

(11) is a velocity command indicating that the feed velocity is 500 mm/min.

When a tool path includes a corner, the tool feed velocity in the vicinity of the corner generally cannot be held constant because of the characteristics of the machine, etc. For example, if an i-th block $b_i$ and an (i+1)th block $b_{i+1}$ of the tool path intersect perpendicularly, as shown in FIG. 11, the tool feed velocity is as shown in FIG. 12. Thus, deceleration and acceleration are required when passing the corner portion. In other words, in the vicinity of the corner, the feed velocity along the X axis is reduced from the commanded velocity $V_c$ and attains a value of zero, after which the feed velocity $V_y$ along the Y axis is increased to reattain the commanded velocity $V_c$.

This deceleration and acceleration of feed at the corner portion has a deleterious effect upon the machining precision of the part. In particular, altering the feed velocity has considerable influence upon machining precision in cases where a high machining velocity is required, as in laser machining.

Though it is necessary that an NC part program be created in such a manner that the machining precision at the corner portion does not suffer, the fact is that NC part programs are created in the prior art without taking machining precision at corner portions into consideration.

Accordingly, an object of the present invention is to provide a method of creating an NC part program for laser machining in which a decline in machining precision at corner portions can be suppressed.

Another object of the present invention is to provide a method of creating an NC part program for laser machining in which machining precision at corner portions can be maintained through a simple technique.

Still another object of the present invention is to provide a method of creating an NC part program in which, when a part has a corner portion on an inner side, machining precision at the corner portion can be improved by inserting a preset escape path at the corner portion.

A further object of the present invention is to provide a method of creating an NC part program in which, when a part has a corner portion on an outer side, machining precision at the corner portion can be improved by changing the machining conditions at the corner portion from the machining conditions which prevailed up to the corner portion, such as by lowering feed velocity and laser power a predetermined distance short of the corner, and restoring the former machining conditions, after the corner is passed, at a point a predetermined distance beyond the corner.

DISCLOSURE OF THE INVENTION

Based on an offset direction which indicates whether a laser beam is offset in a direction to the right side or left side of a travelling direction contained in a motion definition statement, and the direction of a curve at a corner portion of a laser beam path, it is determined whether an inner side or outer side of the beam path at the corner is a part. If the inner side of the corner is a part, an NC part program for laser machining is created upon inserting a preset escape path in the corner portion of the beam path. If the outer side of the corner is a part, an NC part program for laser machining is created in such a manner that similarly set machining conditions prevail in preset machining condition modification intervals.

BRIEF DESCRIPTION OF THE DRAWINGS

FIG. 3 is a block diagram of an automatic programming apparatus for practicing the present invention;

FIG. 4 is a view for describing an NC data output table;

FIG. 5 is a view showing the correlation between function codes and, NC data output formats;

BEST MODE FOR CARRYING OUT THE INVENTION

FIG. 1 is a view for describing the general features of the present invention in a case where the inner side of a corner is part. RB represents a laser beam, $b_i$ an offset path of an i-th block, $b_{i+1}$ an offset path of an (i+1)th block, EP a escape path, CN a corner portion, and PT a part. On the assumption that the point of intersection of the offset paths $b_i$, $b_{i+1}$ of the i-th and (i+1)th blocks is $P_E$, and that points located a distance l from the point of intersection $P_E$ in the direction of extensions of the offset paths are Q, R, the escape path EP will be composed of a line segment $P_EQ$, a circular arc tangent to line segments $P_EQ$, $RP_E$ at points Q, R, respectively, and the line segment $RP_E$.

Figure 1A:
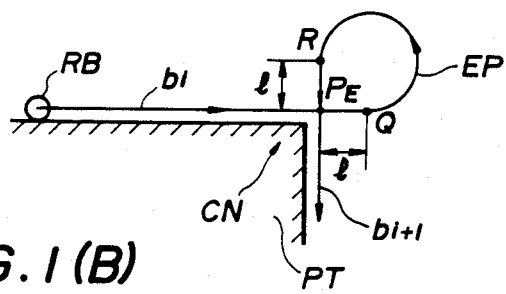
FIGS. 1(A)-(D) are views for describing the general features of the present invention in a case where the inner side of a corner is part.
Figure 1B:
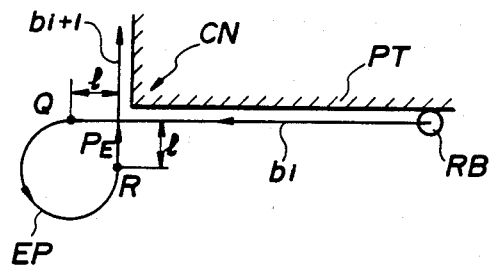
Figure 1C:
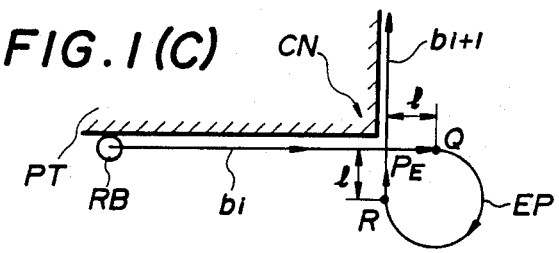
Figure 1D:
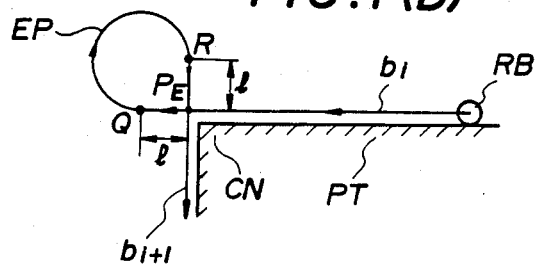

FIGS. 1(A) through (D) all relate to cases where the inner side of a corner is the part PT. FIGS. 1(A), (B) are for cases where the offset direction is on the left side of the travelling direction and the curve at the corner portion is in the clockwise direction. FIGS. 1(C), (D) are for cases where the offset direction is on the right side of the travelling direction and the curve at the corner portion is in the counter-clockwise direction.

The escape path EP inserted at the corner portion CN is preset, and a motion definition statement prepared without taking the escape path into consideration is inputted. It is determined whether the inner side of the beam path at the corner is the part PT based on the offset direction, which indicates whether a laser beam RB is offset in a direction to the right side or left side of the travelling direction contained in the motion definition statement, and the direction of the curve at the corner portion CN of the beam paths $b_i$, $b_{i+1}$. If the inner side of the corner is the part PT, an NC part program is created upon inserting the preset escape path EP in the corner portion. Inserting the escape path EP renders the degree of change in velocity at the corner portion CN negligible in terms of machining precision, thus making highly precise laser machining possible.

FIG. 2 is a view for describing the general features of the present invention in a case where the outer side of a corner is the part. RB represents the laser beam, $b_i$ the offset path of the i-th block, $b_{i+1}$ the offset path of the (i+1)th block, EP the escape path, CN the corner portion, PT the part, P the end point of the i-th block, and QP, PR machining condition modification intervals, the lengths where are $l_1$, $l_2$, respectively, from the end point P.

Figure 2A:
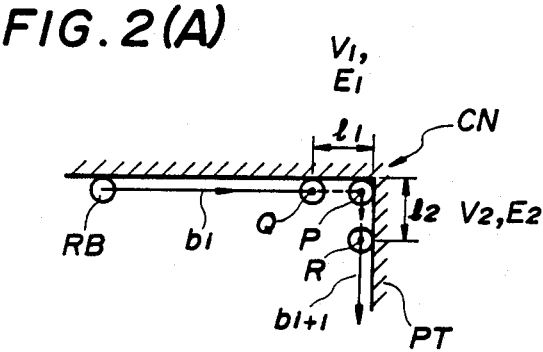
FIGS. 2(A)-(D) are views for describing the general features of the present invention in a case where the outer side of a corner is part.
Figure 2B:
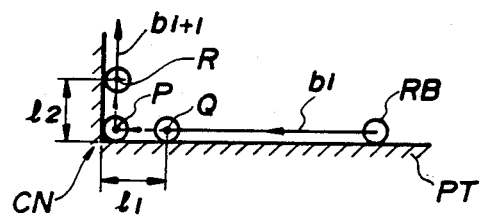
Figure 2C:
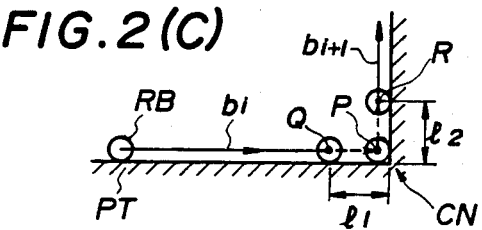
Figure 2D:
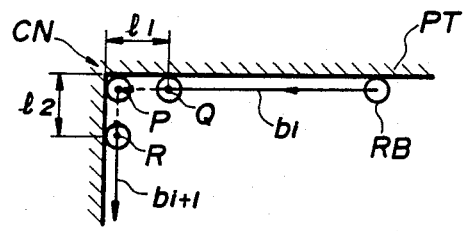

FIGS. 2(A) through (D) all relate to cases where the outer side of a corner is the part PT. FIGS. 2(A), (B) are for cases where the offset direction is on the right side of the travelling direction and the curve at the corner portion is in the clockwise direction. FIGS. 2(C), (D) are for cases where the offset direction is on the left side of the travelling direction and the curve at the corner portion is in the counter-clockwise direction.

The machining condition modification intervals QP, PR (lengths $l_1$, $l_2$) at the corner portion CN and the machining conditions (laser beam feed velocity and laser power value) in these intervals are preset, and a motion definition statement is prepared without taking these machining condition modification intervals and machining conditions into consideration.

In the creation of an NC part program, it is determined whether the outer side of the beam path at the corner is the part PT based on the offset direction, which indicates whether the laser beam RB is offset in a direction to the right side or left side of the travelling direction contained in the motion definition statement, and the direction of the curve at the corner portion CN of the beam paths $b_i$, $b_{i+1}$. If the outer side of the corner is the part PT, an NC part program is created in such a manner that the preset machining conditions prevail in the aforementioned machining condition modification intervals QP, PR.

More specifically, NC data are created for movement at predetermined machining conditions (machining conditions specified by the motion definition statement) up to the point Q, NC data are created for movement at the set machining conditions from point Q to point P, and NC data are created for movement at similar set machining conditions from point P to point R.

FIG. 3 is a block diagram of an automatic programming apparatus according to an embodiment of the present invention.

Numeral 101 denotes a ROM storing a loading program and the like, 102 a processor for executing automatic programming processing, and 103 a RAM.

The RAM 103 has a storage area 103a for storing a system program STPR read in from a floppy disc, a storage area 103b for storing an NC data output table, a storage area 103c for storing a correlation FNT between function codes and ND data output formats, a storage area 103d for storing various parameters PRM, and a working area 103e.

The NC data output table NCDT stored in the storage area 103b has a plurality of function codes F1–F9 specifying NC data output formats for each command, as shown in FIG. 4. Each function code is expressed by four hexadecimal digits. NC data having one execution format are specified by a set of several of these function codes.

Some correlations between function codes stored in storage area 103c and NC output formats are shown in FIG. 5. A coordinate system setting NC data output format in the NC data output table NCDT of FIG. 3 is
8502, 0001, 0101, 0201, 0004
Therefore, the NC data having the execution format for setting the coordinate system is G50XxYyZzEOB (a)

This is obtained by referring to the correlations between function codes and output formats in FIG. 5. The NC data output format for positioning/linear cutting is
8202, 8002, 0001, 0101, 0201, 0141, 0004
The NC data having the execution format for positioning/linear cutting is G90(G91)G00(G01)XxYyZzFfEOB (b)

This is obtained by referring to the correlations between function codes and output formats in FIG. 5. The NC data output format for circular arc cutting is
8202, 8012, 0001, 0101, 0301, 0401, 0004
The NC data having the execution format for circular arc cutting is G90(G91)G02(G02)XxYyIiJj.EOB (c)

This is obtained by referring to the correlations between function codes and output formats in FIG. 5.

Returning to FIG. 3, numeral 104 denotes an NC data memory for storing the NC data created, 105 a keyboard, 106 a display unit (CRT), 107 a disc controller, and FL a floppy disc.

Figure 6A:
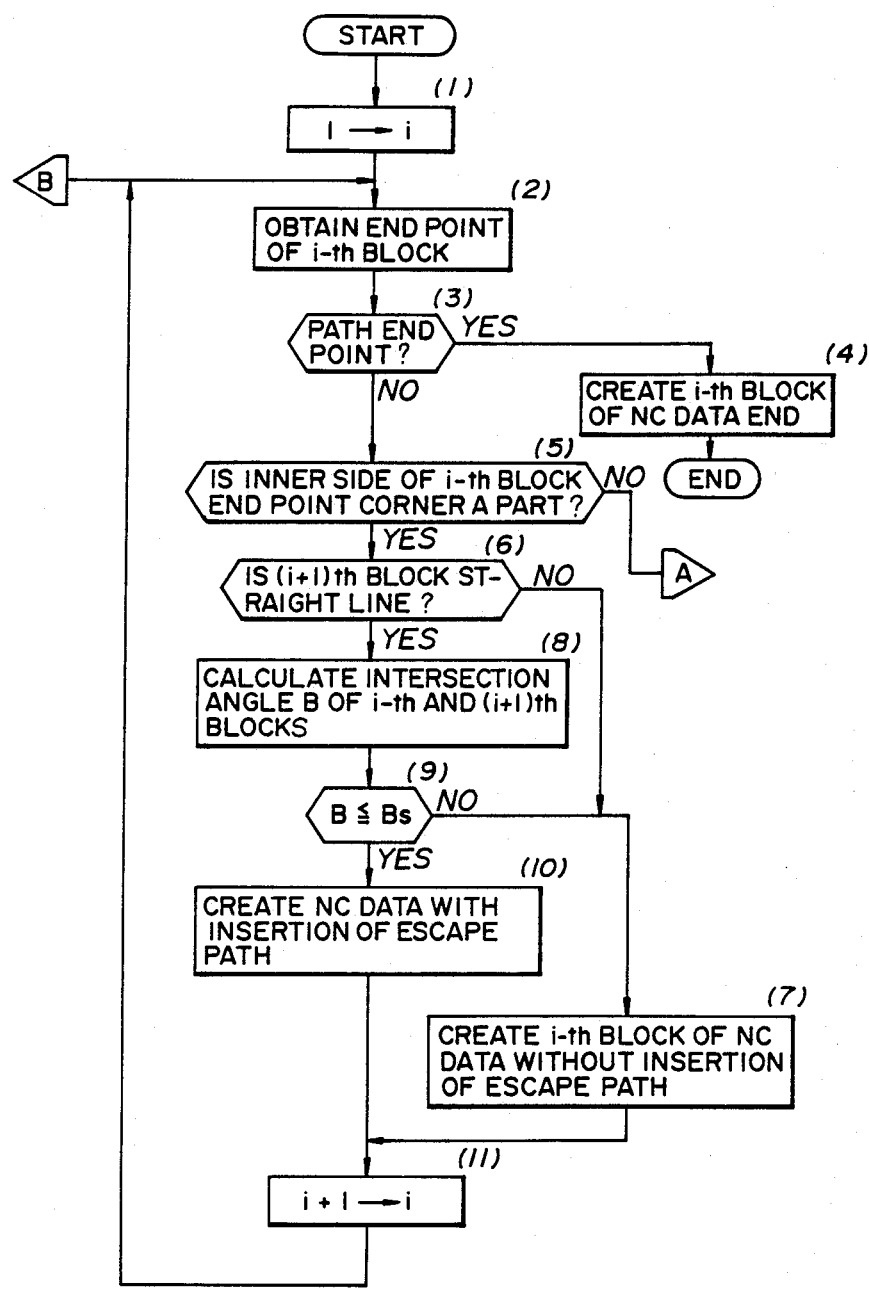
FIGS. 6(A) and (B) are a flowchart of processing according to the invention.
Figure 6B:
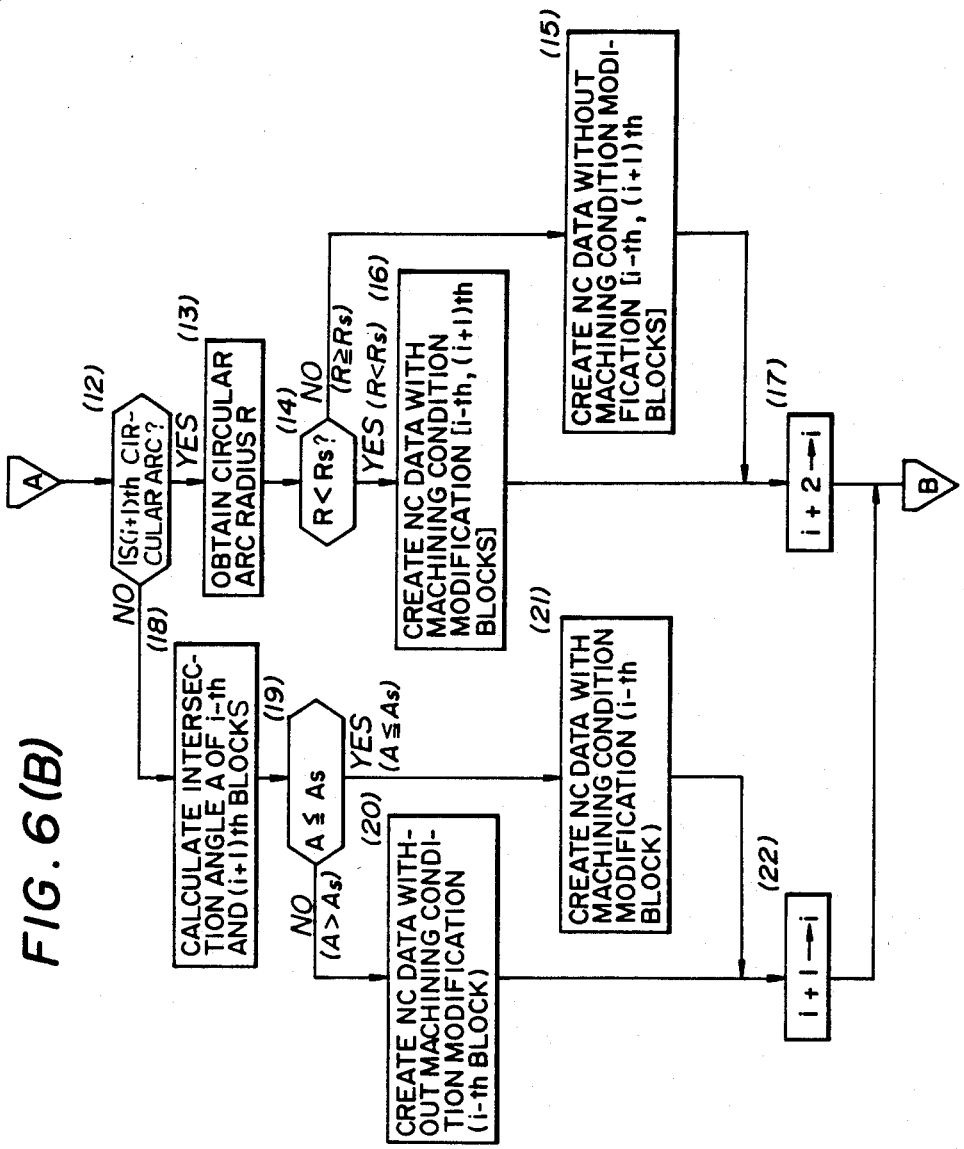
Figure 7:
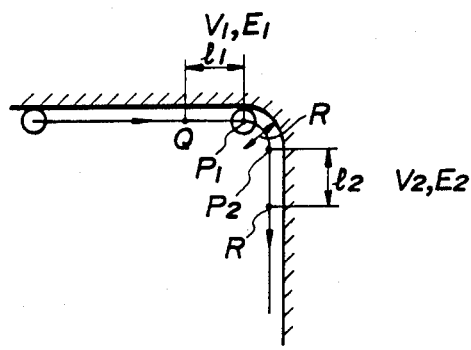
FIG. 7 is a view for describing a corner radius which requires that machining conditions be modified.
Figure 8:
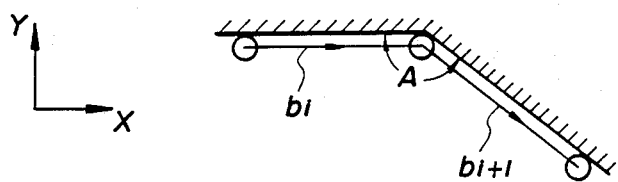
FIG. 8 is a view for describing an angle of intersection which requires that machining conditions be modified.

FIG. 6 is a flowchart of processing according to the present invention, FIG. 7 is a view for describing a corner radius which requires that machining conditions be modified, and FIG. 8 is a view for describing an angle of intersection which requires that machining conditions be modified. Processing according to the invention will now be described with reference to FIGS. 1 through 8. It is assumed that the system program for creating an NC part program for laser machining, the NC data output table NCDT, the correlations FNT between the function codes and NC data output formats, and the parameters from the floppy disc have been stored in the storage areas 103a–103d of the RAM 103. Also it is assumed that the parameters PRM include the escape path EP to be inserted at a corner, an angle $B_S$ serving as a criterion for deciding whether the escape path is to be inserted or not, the machining condition modification intervals QP, PR (see FIG. 2) at the corner portion, data specifying the machining conditions in these intervals, and an angle $A_S$ and radius $R_S$ serving as criteria for deciding whether the machining conditions are to be modified or not.

On the assumption (see FIG. 1) that the point of intersection of the offset paths $b_i$, $b_{i+1}$ of the i-th and (i+1)th blocks is $P_E$, and that points located a distance 1 from the point of intersection $P_E$ in the direction of extensions of the offset paths are Q, R, the escape path EP will be composed of the line segment $P_EQ$, the circular arc tangent to line segments $P_EQ$, $RP_E$ at points Q, R, respectively, and the line segment $RP_E$. In other words, the escape path is a path along which there is no change in cutting velocity at the corner portion. Accordingly, the escape path is not limited to that shown in FIG. 1. The machining condition modification intervals QP, PR for a case where the i-th block and (i+1)th block are straight lines (see FIG. 2) are specified by the distances $l_1$, $l_2$ from the end point P of the i-th block, and the machining conditions are specified by feed velocities $V_1$, $V_2$ and laser power values $E_1$, $E_2$ of the laser beam. In a case where the (i+1)th block is a circular arc (see FIG. 7), machining condition modification intervals $QP_1$, $P_2R$ are specified by the distance $l_1$ from the end point (circular arc starting point) P1 of the i-th block and the distance $l_2$ from the end point (circular arc end point) of the (i+1)th block.

(1) First, when the figure definition statement and motion definition statement are created and inputted, the processor 102 performs the operation 1→i. It should be noted that the escape path, machining condition modification intervals and machining conditions in these intervals are not taken into consideration in the motion definition statement.

(2) Next, the end point of the i-th block is computed from the figure definition statement and motion definition statement.

(3) When the end point of the i-th block is obtained, a check is performed to determine whether this end point is the end point of the laser beam path.

(4) If the end point is the end point of the path, then the i-th block of NC data is created using the coordinates of this end point and processing for creating the NC part program is ended.

(5) If the end point is found not to be the end point of the path in step (3), then it is checked whether the inner side or outer side of the corner portion at the end point of the i-th block is the part.

It should be noted that the inner side of the corner is the part in a case where the offset direction of the laser beam is on the left side of the travelling direction and curves clockwise at the end point corner portion [see FIGS. 1(A), (B)], and in a case where the offset direction of the laser beam is on the right side of the travelling direction and curves counterclockwise at the end point corner portion [see FIGS. 1(C), (D)]. Conversely, the outer side of the corner is the part in a case where the offset direction of the laser beam is on the right side of the travelling direction and curves clockwise at the end point corner portion [see FIGS. 2(A), (B)], and in a case where the offset direction of the laser beam is on the left side of the travelling direction and curves counterclockwise at the end point corner portion [see FIGS. 2(C), (D)].

Processing is executed from step (6) onward if the inner side of the corner is the part, and from step (12) onward if the outer side of the corner is the part.

(6) If the inner side of the corner is the part, it is determined whether the (i+1)th block is a straight line.

(7) If this block is a circular arc, the i-th block of NC data is created without inserting an escape path at the corner.

(8) If the (i+1)th block is a straight line, the angle of intersection B between the i-th block and (i+1)th block is calculated.

(9) Next, the angle B and a preset angle $B_S$ are compared in terms of magnitude.

If the corner angle B is acute and relatively large, the change in velocity at the corner portion will not be great enough to influence machining precision. Therefore, in accordance with the present invention, if the corner angle B is larger than the preset angle (the minimum allowable angle that will have no influence upon machining precision) $B_S$, an escape path is not inserted even though the inner side of the corner is the part.

Accordingly, if $B > B_S$ holds, the i-th block of NC data is created at step (7) without inserting an escape path.

(10) If $B \leq B_S$ holds, however, NC data are created in such a manner that the escape path EP that has been set in the parameter storage area is inserted after the i-th block.

(11) Thereafter, i is incremented by the operation i+1→i and the processing from step (2) onward is repeated.

It should be noted that the reason why machining velocity does not change at the corner portion CN owing to insertion of the escape path EP is that pulses generated by a pulse distributing operation are not interrupted at the corner portion thanks to the insertion of the escape path. Further, when the (i+1)th block is a circular arc at step (6), the escape path is not inserted. The reason for this is that it is assumed that the straight line of the i-th block and the circular arc of the (i+1)th block are tangent to each other. Accordingly, if the straight line of the i-th block and the circular arc of the (i+1)th block are not tangent to each other, the point of intersection between the straight line and circular arc is obtained, a line tangent to the circular arc at the point of intersection is obtained, the angle of intersection B between this tangent line and the straight line is determined, and the escape path EP is inserted when the angle B is less than the predetermined angle $B_S$.

The foregoing relates to a case where the inner side of a corner is the part. In an instance where the outer side of a corner is the part, processing is executed from step (12) onward.

(12) If the outer side of the corner is the part, it is determined whether the (i+1)th block is a circular arc. If the radius of the corner arc is greater than a predetermined value, the change in the cutting velocity of the laser beam at the corner portion will not be great enough to influence machining precision. Therefore, in accordance with the present invention, if the corner arc radius R (see FIG. 7) is greater than a preset radius RS, the machining conditions are not modified even though the outer side of the corner is the part.

(13) Accordingly, if the (i+1)th block is found to be a circular at step (12), the corner radius R is calculated; if not, the program jumps to step (18).

(14) If the (i+1)th block is a circular arc and the corner arc radius R has been obtained, it is determined whether $R < R_S$ holds.

(15) If $R \geq R_S$ holds, the i-th block (straight line block) and (i+1)th block (circular arc block) of NC data are created without modifying the machining conditions.

(16) If $R < R_S$ holds, however, NC data are created in such a manner that the aforementioned set machining conditions prevail in machining condition modification intervals $QP_1$, $P_1P_2$, $P_2R$ (see FIG. 7) specified by $l_1$, $l_2$ set in the parameter storage area 103d.

More specifically, NC data for movement up to point Q at the predetermined machining conditions (machining conditions specified by the motion definition statement) are created, NC data for movement from point Q to point $P_1$ at machining conditions set together with $l_1$ are created, NC data for movement from point $P_1$ to point $P_2$ at machining conditions identical with those between Q and $P_1$ are created, and NC data for movement from point $P_2$ to point R at machining conditions set together with $l_2$ are created. The laser power value is set by an S code.

(17) At the end of processing for steps (15) and (16), i is incremented by the operation 1+2→i and processing from step (2) onward is subsequently repeated.

(18) If the decision rendered at sep (12) is that the (i+1)th block is a straight line, an angle of intersection A (see FIG. 8) between the i-th block and (i+1)th block is calculated.

(19) Next, the angle A and a preset angle $A_S$ are compared in terms of magnitude.

If the corner angle A is acute and relatively large, the change in velocity at the corner portion will not be great enough to influence machining precision. Therefore, in accordance with the present invention, if the corner angle A is larger than a preset angle $A_S$, machining conditions are not modified even though the outer side of the corner is the part.

(20) Accordingly, if $A > A_S$ holds, the i-th block of NC data is created without modifying machining conditions.

(21) If $A \leq A_S$ holds, however, NC data are created in such a manner that the aforementioned set machining conditions will prevail in machining condition modification intervals QP, PR (see FIG. 2) specified by $l_1$, $l_2$ set in the parameter storage area 103d. More specifically, NC data for movement up to point Q at the predetermined machining conditions (machining conditions specified by the motion definition statement) are created, NC data for movement from point Q to point P at machining conditions set together with $l_1$ are created, and NC data for movement from point P to point R at machining conditions set together with $l_2$ are created.

(22) At the end of the processor for steps (20), (21), i is incremented by the operation $i+1 \rightarrow i$, after which processing is repeated from step (2) onward.

Figure 9:
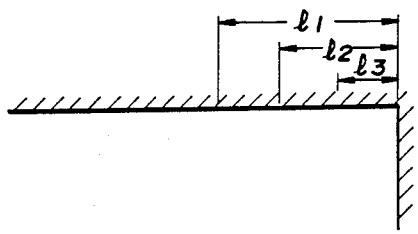
FIG. 9 is a view for describing a case where a plurality of machining condition modification intervals are inserted at a corner.
Figure 10:
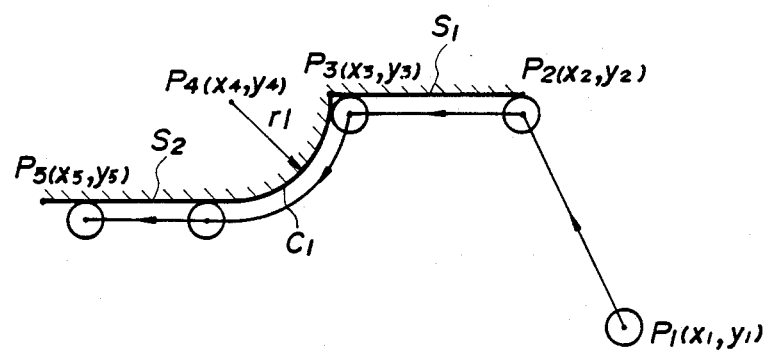
FIG. 10 is a view for describing automatic programming according to the prior art.
Figure 11:
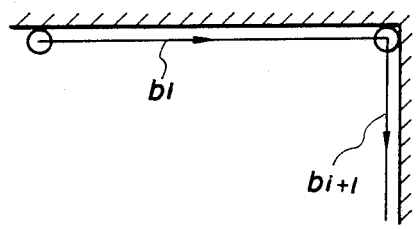
FIGS. 11 and 12 are views for describing a disadvantage of the prior-art method.
Figure 12:
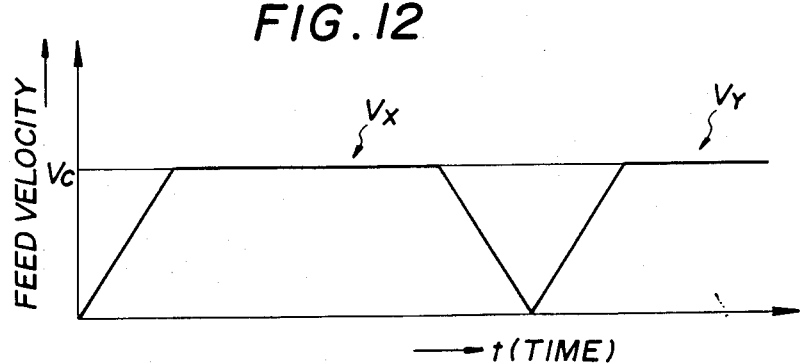

It should be noted that the machining velocity (laser beam feed velocity) and laser power value at the corner portion are set so that they will be smaller the machining velocity and laser power value which prevailed up to the corner portion. In the foregoing, the case is one in which one machining condition modification interval is provided in each block. However, as shown in FIG. 9, it is possible to adopt an arrangement in which a plurality of machining condition modification intervals indicated by $l_1, l_2, l_3$ are provided in one block, with the settings being such that the machining velocity and laser power value in each interval gradually decrease and gradually increase.

Thus, in accordance with the present invention, an escape path to be inserted at a corner portion is preset, and the arrangement is such that if the inner side of the corner is a part, an NC part program is created upon inserting the preset escape path at the corner portion. As a result, the feed velocity does not undergo a large change at the corner portion and, hence, any decline in machining precision at the corner portion can be suppressed. Moreover, a laser machining NC part program in which machining precision at the corner portion can be maintained is capable of being created through a simple technique.

Further, in accordance with the invention, a minimum allowable angle $B_S$ which does not influence machining precision at a corner portion is preset, and the arrangement is such that the escape path is inserted at the corner portion only if the actual corner angle B is less than $B_S$ and the inner side of the corner is the part. As a result, the number of corner portions requiring insertion of an escape path can be reduced to lessen the effect upon machining time.

Further, in accordance with the invention, machining condition modification intervals at a corner portion and machining conditions are preset. The arrangement is such that if the outer side of the corner is the part, the set machining conditions are adopted as the machining conditions at the corner portion. For example, it can be so arranged that the feed velocity and laser power are changed a predetermined distance short of the corner, and the original machining conditions are restored at a point a predetermined distance beyond the corner. This makes it possible to create, through a simple technique, an NC part program in which a decline in machining precision at the corner portion can be suppressed.

We claim:

1. A method of creating an NC part program for laser machining in which a figure definition statement for defining a figure and a motion definition statement for defining a laser beam path are inputted, and these definition statements are converted, by using an NC data output table, into a laser machining NC part program executable by an NC unit, which NC part program is then outputted, said method characterized by:

presetting an escape path to be inserted at a corner portion, and inputting a motion definition statement created without taking said escape path into consideration;

determining, based on an offset direction which indicates whether the beam is offset in a direction to the right side or left side of a travelling direction contained in the motion definition statement, and the direction of a curve at the corner portion of the beam path, whether an inner side of the beam path at said corner is a part; and creating an NC part program upon inserting said present escape path at said corner portion if the inner side of the corner is the part.

2. A method of creating an NC part program for laser machining according to claim 1, characterized by:

presetting an angle $B_S$ of the corner portion and obtaining an angle B at the corner portion of the beam path;

comparing the size of angle B and the side of the set angle $B_S$; and inserting said escape path at the corner portion if $B < B_S$ holds and the inner side of the corner is the part.

3. A method of creating an NC part program for laser machining according to claim 1, characterized in that the relief path is composed of a line segment $P_E Q$, a circular arc tangent to line segments $P_E Q$, $RP_E$ at points Q, R, respectively, and the line segment $R_{P E}$, where a point of intersection of beam paths $b_i$, $b_{i+1}$ of respective i-th and (i+1)th blocks forming the corner portion is $P_E$, and points located a distance 1 from the point of intersection $P_E$ along extensions of the offset paths are Q, R.

4. A method of creating an NC part program for laser machining in which a figure definition statement for defining a figure and a motion definition statement for defining a laser beam path are inputted, and these definition statements are converted, by using an NC data output table, into a laser machining NC part program executable by an NC unit, which NC part program is then outputted, said method characterized by:

presetting machining condition modification intervals at a corner portion and machining conditions in said intervals;

creating a motion definition statement without taking said machining condition modification intervals and said machining conditions into consideration;

determining, based on an offset direction which indicates whether the beam is offset in a direction to the right side or left side of a travelling direction contained in the motion definition statement, and the direction of a curve at the corner portion of the beam path, whether an outer side of the beam path at said corner is a part; and creating an NC part program in such a manner that said set machining conditions will prevail in said machining condition modification intervals if the outer side of the corner is the part.

5. A method of creating an NC part program for laser machining according to claim 4, characterized in that said machining conditions are such that feed velocity and laser power value in said machining condition modification intervals are made less than feed velocity and laser power value up to said machining condition modification intervals.

6. A method of creating an NC part program for laser machining according to claim 5, characterized in that a plurality of machining condition modification intervals and machining conditions are set for the corner portion.

7. A method of creating an NC part program for laser machining according to claim 4, characterized by:

presetting an angle $A_S$ of the corner portion and obtaining an angle A at the corner portion of the beam path;

comparing the size of angle A and the size of the set angle $A_S$; and creating an NC part program in such a manner that the set machining conditions will prevail in said machining condition modification intervals if $A<A_S$ holds and the outer side of the corner is the part.

8. A method of creating an NC part program for laser machining according to claim 4, characterized by:

presetting a radius $R_S$ of a corner circular arc;

if a circular arc resides at the corner of the beam path, comparing the size of a radius R of said circular arc and the size of said set circular arc radius $R_S$; and creating an NC part program in such a manner that said set machining conditions will prevail in said machining condition modification intervals if $R<R_S$ holds and the outer side of the corner is the part.

* * * * *

UNITED STATES PATENT AND TRADEMARK OFFICE
CERTIFICATE OF CORRECTION

PATENT NO. : 4,870,560
DATED : September 26, 1989
INVENTOR(S) : Seki et al.

It is certified that error appears in the above-identified patent and that said Letters Patent is hereby corrected as shown below:

Col. 1, line 8, "creating," should be --creating--.

Col. 2, line 28, "$P_5$and" should be --$P_5$ and--.

Col. 4, line 12, "a escape" should be --an escape--.

Col. 5, line 69, "XxYyIiJEOB" should be --XxYyIiJjEOB--.

Col. 8, line 37, "$P_1$to" should be --$P_1$ to--;

line 38, "$P_2$at" should be --$P_2$ at--;

line 39, "$P_1$are" should be --$P_1$ are--;

line 40, "$P_2$to" should be --$P_2$ to--;

line 46, "sep" should be --step--.

Col, 10, line 24, "RPE" should be --$RP_E$--;

line 25, "$R_{PE}$" should be --$RP_E$--.

Signed and Sealed this

Sixteenth Day of October, 1990

Attest:

HARRY F. MANBECK, JR.

Attesting Officer      Commissioner of Patents and Trademarks